United States Patent [19]
Sone et al.

[11] Patent Number: 5,584,541
[45] Date of Patent: Dec. 17, 1996

[54] SLIP CONTROL SYSTEM FOR MOTOR VEHICLE

[75] Inventors: Akira Sone, Hiroshima; Toshiaki Tsuyama, Higashi-Hiroshima; Kazutoshi Nobumoto, Hiroshima-ken; Fumio Kageyama, Hiroshima; Haruki Okazaki, Hiroshima; Makoto Kawamura, Hiroshima, all of Japan

[73] Assignee: Mazda Motor Corporation, Hiroshima, Japan

[21] Appl. No.: 336,212

[22] Filed: Nov. 3, 1994

Related U.S. Application Data

[63] Continuation of Ser. No. 64,729, May 21, 1993, abandoned, which is a continuation of Ser. No. 648,128, Jan. 30, 1991, abandoned.

[30] Foreign Application Priority Data

| Jan. 31, 1990 | [JP] | Japan | 2-21070 |
| Feb. 22, 1990 | [JP] | Japan | 2-41551 |
| Mar. 30, 1990 | [JP] | Japan | 2-83606 |

[51] Int. Cl.⁶ ................................. B60K 28/16
[52] U.S. Cl. ........................... 303/146; 303/140
[58] Field of Search .................. 303/111, 100, 303/110, 103, 113.2, 146, 147, 148, 140; 364/426.03; 180/197

[56] References Cited

U.S. PATENT DOCUMENTS

| 3,719,246 | 3/1973 | Bott | 180/197 |
| 4,626,040 | 12/1986 | Ogino | 180/197 |
| 4,739,856 | 4/1988 | Inagaki et al. | 180/197 |
| 4,758,053 | 7/1988 | Yasuno | 303/111 |
| 4,926,333 | 5/1990 | Hashiguchi et al. | 180/197 |
| 4,940,109 | 7/1990 | Preston et al. | 180/197 |
| 4,970,650 | 11/1990 | Hashiguchi et al. | 180/197 |
| 4,976,330 | 12/1990 | Matsumoto | 180/197 |
| 5,022,483 | 6/1991 | Tsuyama et al. | 180/197 |
| 5,024,285 | 6/1991 | Fujita | 180/197 |
| 5,025,882 | 6/1991 | Ghoneim et al. | 180/197 |

FOREIGN PATENT DOCUMENTS

| 265969 | 5/1988 | European Pat. Off. . |
| 321894 | 6/1989 | European Pat. Off. . |
| 338588 | 10/1989 | European Pat. Off. . |
| 3545715 | 7/1987 | Germany . |
| 3546571 | 10/1987 | Germany . |
| 89/02842 | 4/1989 | WIPO . |

*Primary Examiner*—Matthew C. Graham
*Attorney, Agent, or Firm*—Keck, Mahin & Cate

[57] ABSTRACT

A slip control system for a motor vehicle controls slippage of driving wheels and includes a sensor for detecting a slip ratio of each driving wheel, a device for decreasing slip of each driving wheel by controlling a driving force transmitted to the driving wheel so that the slip ratio of the driving wheel is at least equal to a predetermined desired slip ratio when the slip ratio of the driving wheel is equal to the desired slip ratio, a sensor for detecting a yawing rate of the vehicle, and a sensor for detecting a steering amount of the vehicle. The slip decreasing device includes a correcting device for decreasing the desired slip ratio when a steering condition is detected based on amounts detected by both the yawing rate detecting sensor and the steering amount detecting sensor.

27 Claims, 13 Drawing Sheets

SLIP CONTROL SYSTEM FOR MOTOR VEHICLE

This is a continuation of application Ser. No. 08/064,729, filed May 21, 1993, now abandoned, which is a continuation of Ser. No. 07/648,128, filed Jan. 30, 1991, now abandoned.

BACKGROUND OF THE INVENTION

1. Field of the Invention

The present invention relates to a slip control system for a motor vehicle and, in particular, to a slip control system which is able to improve the stability of a motor vehicle when the vehicle undergoes a steering operation.

2. Description of Related Art

There have been proposed slip control systems for motor vehicles such as those shown in Japanese Patent Laid-Open Publication No. 58-16948, No. 57-22948, No. 2-231836, No. 64-94029, and the like. When an excessive slip is caused between driving wheels and road surfaces during starting and/or running operations, the slip control system decreases the excessive slip under a predetermined value to obtain driving forces which are transmitted to the road surfaces from the driving wheels. Therefore, not only starting and accelerating abilities but also running and driving stabilities are improved.

The slip control system may include an engine control system which decreases a degree of opening of a throttle valve, delays an ignition timing, and cuts fuel to the engine so as to decrease an excessive engine output. The slip control system also may include a brake control system which increases brake fluid pressure so as to transitionally increase a braking force of driving wheels. When the vehicle is running on a low friction coefficient road surface, an excessive depression of the acceleration pedal causes an excessive slip of the driving wheels. The engine control system and/or brake control system decreases the driving torque transmitted to the driving wheels so as to decrease the excessive slip under a predetermined desired value and obtain driving forces which are transmitted to the road surfaces from the driving wheels.

The behavior characteristic of the vehicle in the slip condition of the driving wheels when the vehicle is running straight is different from that when the vehicle is steered. When the vehicle is steered, a relatively large change in the behavior of the driving wheels is caused by a relatively small slip and, therefore, the vehicle is unstable.

However, since the above-mentioned slip control system controls the driving torque transmitted to the driving wheels in accordance with substantially the same desired slip ratio when the vehicle is running straight and when it is steered, the vehicle is not able to correspond properly to the behavior change of the driving wheels in the steering operation, so that the vehicle is unstable.

SUMMARY OF THE INVENTION

It is, therefore, an object of the invention to provide a slip control system for improving the stability of the vehicle in a steering operation.

It is another object of the invention to provide a slip control system for improving the stability of the vehicle in the steering operation and providing the vehicle with good controllability.

According to the present invention, there is provided a particular slip control system for a motor vehicle for controlling slips of driving wheels. The slip control system includes means for detecting a slip ratio of each driving wheel, means for decreasing a slip of each driving wheel by controlling a driving force transmitted to the driving wheel so that the slip ratio of the driving wheel is at least equal to a predetermined desired slip ratio when the slip ratio of the driving wheel is equal to the desired slip ratio, means for detecting a yawing rate of the vehicle, and means for detecting a steering amount of the vehicle. The slip decreasing means includes correcting means for decreasing the desired slip ratio when a steering condition is detected based on amounts detected by both the yawing rate detecting means and the steering amount detecting means.

According to another aspect of the present invention, there is provided a slip control system for a motor vehicle for controlling slips of driving wheels including means for detecting a slip ratio of each driving wheel, brake control means for decreasing a slip of each driving wheel independently by controlling brake fluid pressure in each driving wheel so that the slip ratio of each driving wheel is at least equal to a predetermined desired slip ratio when the slip ratio of each driving wheel is equal to the desired slip ratio, and means for detecting a yawing rate of the vehicle. The brake control means controls the brake fluid pressure in each driving wheel equally, based on the desired slip ratio of each driving wheel, when a yawing rate, more than or equal to a predetermined value, is detected by the yawing rate detecting means.

According to yet another aspect of the present invention, there is provided a slip control system for a motor vehicle for controlling slips in driving wheels including brake force control means for controlling a slip ratio of each driving wheel by controlling a brake force of each driving wheel, means for detecting a steering condition of the vehicle, means for detecting a small accelerator opening condition of the vehicle, and means for decreasing a brake force control gain in the brake force control means when both a steering condition a small accelerator opening condition are detected by the steering condition detecting means and small accelerator opening condition detecting means.

The above and other objects and features of the present invention will be apparent from the following description and by making reference to the accompanying drawings showing preferred embodiments of the present invention.

DESCRIPTION OF THE PREFERRED EMBODIMENTS

Figure 1:
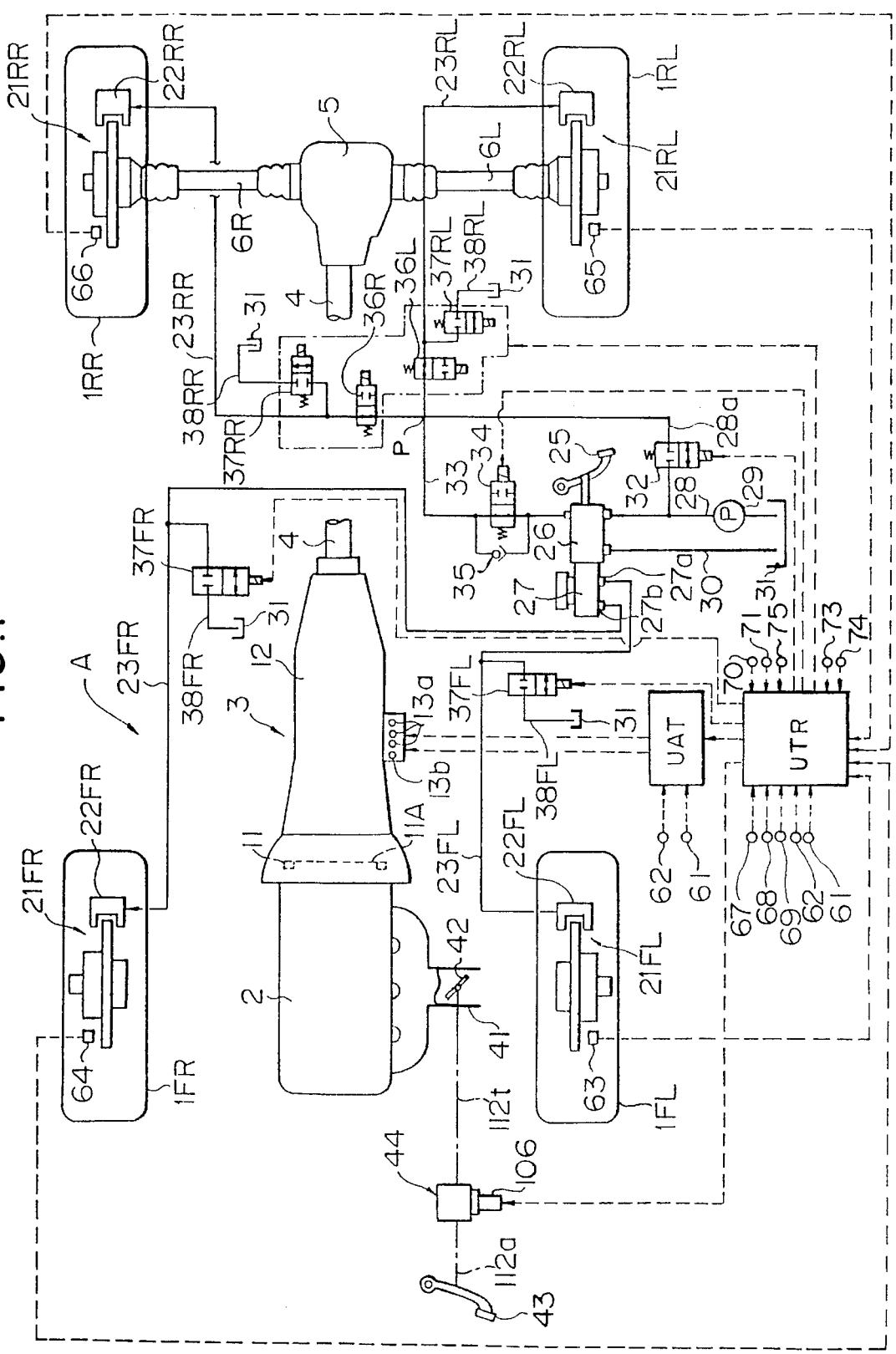
FIG. 1 is a general diagram of a slip control system in accordance with the present invention.

Referring to FIG. 1, there is shown a motor vehicle A having a slip control system in accordance with one embodiment of the present invention. The vehicle A has right and left front wheels 1FR, 1FL for driven wheels, and right and left rear wheels 1RR, 1RL for driving wheels.

A driving system includes an engine 2 disposed in the front portion of the vehicle, an automatic transmission 3 connected directly to a crankshaft of the engine 2, a propeller shaft 4 connected to an output shaft of the automatic transmission 3, a differential 5 connected to the rear end portion of the propeller shaft 4, and driving shafts 6R, 6L extending from the differential 5 in right and left directions, respectively, and connected to the right rear wheel 1RR and the left rear wheel 1RL, respectively.

A throttle valve 42 is provided in an intake path 41 of the engine 2 to control the amount of intake air. The throttle valve 42 is connected to an acceleration pedal 43 through a throttle opening control mechanism 44 and an acceleration wire 112a. The throttle opening control mechanism 44 includes a motor 106 which decreases the 20 opening of the throttle valve 42 transitionally.

The automatic transmission 3 includes a torque converter 11 with a lockup clutch 11A operated by hydraulic pressure and a transmission 12 with a multiple-stage transmission gear mechanism. The transmission control operation is carried out by selecting combinations of magnetization and/or demagnetization of a plurality of solenoids 13a which are incorporated in a hydraulic control circuit for the automatic transmission 3. Connection and disconnection of the lockup clutch 11A is carried out by selecting magnetization or demagnetization of a solenoid 13b which is incorporated in the hydraulic control circuit.

The motor vehicle A includes a brake system. The brake system includes each brake 21FR, 21FL, 21RR, 21RL provided in each wheel 1FR, 1FL, 1RR, 1RL, a tandem type master cylinder 27 connected through each caliper (brake cylinder) 22FR, 22FL of the front wheel brakes 21FR, 21FL and each brake conduit 23FR, 23FL, a hydraulic booster 26 connected through each caliper 22RR, 22RL of the rear wheel brakes 21RR, 21RL and each brake conduit 23RR, 23RL, and a brake pedal 25.

The master cylinder 27 supplies predetermined brake fluid pressure to the front wheels 1FR, 1FL. The master cylinder 27 changes the braking force which is applied to the brake pedal 25 and boosted by the booster 26 into the brake fluid pressure and then supplies the brake fluid pressure to the calipers 22FR, 22FL through each brake conduit 23FR, 23FL connected, respectively, to first discharge outlet 27b and second discharge outlet 27a.

The brake conduits 23FR, 23FL include relief conduits 38FR, 38FL, respectively, each of which has an end which communicates with a reservoir 31. The relief conduits 38FR, 38FL include normal closed type magnetic proportional switching valves 37FR, 37FL, which work as an outlet valves of an antilock braking system (ABS). FIG. 1 shows the condition in which the switching valves 37FR, 37FL are switched to the closing positions.

The booster 26 boosts the braking force of the brake pedal 25 and transmits it to the master cylinder 27, and supplies brake fluid pressure from a booster chamber (not shown) to the calipers 22RR, 22RL through each brake conduit 23RR, 23RL to which an accumulator (not shown) is connected. A pump 29 is connected to the booster 26 through a fluid pressure supplying conduit 28. The pump 29 supplies the fluid in a reservoir 31 at a predetermined pressure to the 5 conduit 28, which is maintained at a predetermined line pressure by the accumulator. A return conduit 30 is connected to the booster 26 so as to return the fluid from the booster 26 to the reservoir 31.

The booster chamber of the booster 26 is connected to a brake conduit 33, in which a normally open type magnetic switching valve 34 is provided, and a one-way valve 35 is provided parallel to the switching valve 34. FIG. 1 shows a condition in which the switching valve 34 is switched to the opening position. The brake conduit 33 branches into brake conduits 23RR, 23RL for the rear wheels 1RR, 1RL at a junction point P. A normally open type magnetic proportional switching valve 36R, 36L is provided in each brake conduit 23RR, 23RL. Each brake conduit 23RR, 23RL is provided with a relief conduit 38RR, 38RL, which branches from the down stream portion of the switching valves 36R, 36L and communicates with the reservoir 31, respectively. The relief conduits 38RR, 38RL are provided with normally closed type magnetic proportional switching valves 37RR, 37RL, respectively, which work as an outlet valve of an antilock braking system (ABS). FIG. 1 shows a condition in which the switching valves 37RR, 37RL are switched to the closed positions.

At the junction point P, there is provided a branch conduit 28a communicating with the conduit 28. The branch conduit 28a is provided with a normally closed type switching valve 32. FIG. 1 shows a condition in which the switching valve 32 is switched to the closed position.

The motor vehicle A further includes a control unit UAT for the automatic transmission 3, a slip control unit UTR which includes an antilock braking control system (hereinafter called ABS control system), and a traction control system. The solenoids 13a, 13b are controlled by the control unit UAT for the automatic transmission 3. When the brakes are operated, the ABS control system maintains a desired friction force between each wheel 1FR, 1FL, 1RR, 1RL and the road surface to obtain the optimal braking force for the vehicle. When excessive slip is caused in the rear wheels 1RR, 1RL while the vehicle is running or starting, the traction control system decreases the amount of excessive slip so as to obtain the desired driving force for the rear wheels 1RR, 1RL.

The control unit UAT receives detected signals from sensors 61, 62. The sensor 61 detects the opening of the throttle valve 42 and the sensor 62 detects the vehicle speed based on the rotation speed of the propeller shaft 4. In accordance with these signals and stored transmission and lockup characteristics, the control unit UAT determines the transmission and lockup conditions, and then outputs the control signals to the solenoids 13a, 13b of the automatic transmission 3 to carry out the transmission and lockup controls.

To the slip control unit UTR are input various kinds of signals which are detected, respectively, by the throttle sensor 61, the vehicle speed sensor 62, wheel rotation speed sensors 63, 64, 65, 66 for detecting the wheel rotation speed of each wheel 1FR, 1FL, 1RR, 1RL, an acceleration opening sensor 67 for detecting the depression amount of the pedal 43, a motor rotation amount sensor 68 for detecting the rotation amount of the motor 106, a steering sensor 69 for detecting the angular steering amount of a steering wheel (not shown), a manual switch 70 for selecting control modes, a brake switch 71 for detecting the depression of the pedal 25, a G sensor 73 for detecting a reduction speed of the vehicle, a yawing rate sensor 74 for detecting a yawing rate (an angular speed around the vertical direction of the vehicle) of the vehicle, and a shift position sensor 75 for detecting shift positions.

The control unit UTR further includes an input interface for receiving the signals from the above mentioned sensors, a microcomputer comprising a ROM in which control programs and various kinds of control maps and the like are stored, a RAM in which various kinds of memories necessary for carrying out the control are stored, and a CPU, an output interface for outputting control signals to the control unit UAT, and control circuits for operating the valves 32, 34, 36R, 36L, 37FR, 37FL, 37RR, 37RL and the motor 106.

In the control unit UTR, the ABS control system detects slip conditions of each wheel 1FR, 1FL, 1RR, 1RL based on the difference between an estimated vehicle speed and the wheel rotation speed of each wheel detected by each sensor 63, 64, 65, 66. The estimated vehicle speed is computed based on the reduction speed of the vehicle detected by the G sensor 73. When the ABS control system determines that at least one of the wheels 1FR, 1FL, 1RR, 1RL is in the lock condition, the system controls the openings of the switching valves 37FR, 37FL, 37RR, 37RL and decreases the line fluid pressure in the brake conduit(s) 23FR, 23FL, 23RR, 23RL for a wheel which is determined to be in the lock condition so as to cancel the lock condition. For example, in the braking operation, if the ABS control system detects an excessive slip in the front wheel 1FL it then carries out a duty control on the switching valve 37FL so as to increase the opening of the switching valve 37FL so that the fluid pressure in the brake conduit 23FL and the caliper 22FL is decreased. Then, the brake fluid pressure in the brake 21FL is decreased transitionally. The slip in the front wheel 1FL is controlled so that the front wheel 1FL is able to obtain a desired friction force against the road surface and an optimal braking force.

In the control unit UTR, the traction control system carries out an engine control and a brake control. The engine control is carried out by controlling the revolution amount of the motor 106 in the throttle opening control mechanism 44 to decrease the output of the engine 2 transitionally when excessive slip is caused in the driving wheels (the rear wheels 1RR, 1RL) at a time when the vehicle is starting or running. The brake control is carried out by controlling the open and close positions of the valves 32, 34 and the degree of opening of the valves 36R, 36L, 37RR, 37RL so as to control the value of the brake fluid pressure. By the engine control operation and the brake control operation, driving torques transmitted to the rear wheels 1RR, 1RL are decreased and the slips in the rear wheels 1RR, 1RL are controlled.

In the engine control operation, the throttle opening control mechanism 44 decreases the degree of opening of the throttle valve 42 less than the acceleration opening of the pedal 43 to decrease the output of the engine 2.

Figure 2A:
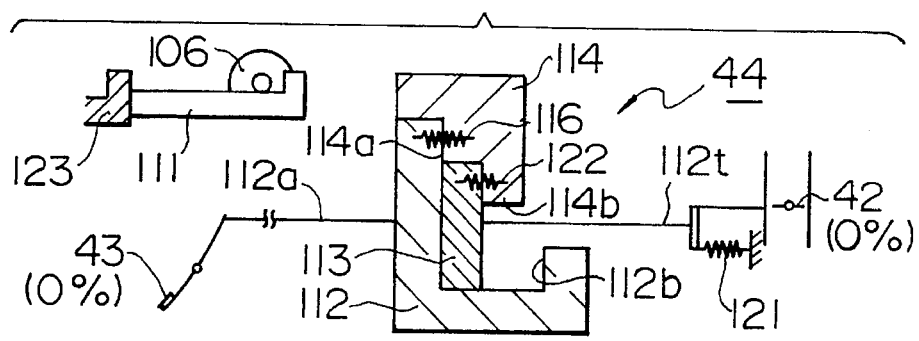
FIGS. 2A through 2D are schematic views showing the operation of a throttle opening control mechanism.

Referring to FIG. 2A, the throttle opening control mechanism 44 will be described hereinafter with reference to FIGS. 2A–2D. The throttle opening control mechanism 44 includes an acceleration pedal side lever 112 connected to the acceleration pedal 43 through the acceleration wire 112a, a throttle valve side lever 113 connected to the throttle valve 42 through a throttle wire 112t, an abutting lever 114 having an abutting portion 114a for abutting on the right side of the lever 112 and an abutting portion 114b for abutting on the right side of the lever 113, a driving lever 111 provided to be driven to the left and to the right, the motor 106 driving the lever 111, and a stopper 123 restricting the leftward movement of the lever 111 to within a predetermined amount.

The lever 113 is biased to the right, which is the direction for closing the throttle valve 42, by a return spring 121. Disposed between the lever 112 and the lever 114 is a spring 116 for biasing the abutting portion 114a to cause it to abut on the lever 112. In the same way, disposed between the lever 113 and the lever 114 is a spring 122 for biasing the abutting portion 114b to cause it to abut on the lever 113. The biasing force of the spring 116 is set larger than those of the spring 122 and the return spring 121. The throttle opening control mechanism 44, constructed as described above, operates as follows.

Figure 2B:
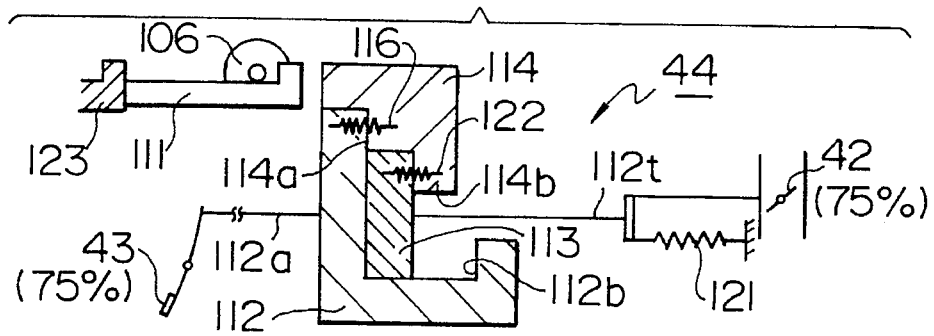

First, there is a condition in which the lever 111 abuts against the stopper 123. In this condition, the levers 112, 113 and 114 are made integral under the biasing force of the springs 116 and 122 as shown in FIGS. 2a, 2b, so that the degree of opening of the throttle obtained, hereinafter called a throttle opening, is proportional to the degree of opening of the accelerator, hereinafter called an accelerator opening. That is, the throttle opening varies within a range of 0~100%, while the accelerator opening varies within a range of 0~100%. FIG. 2a shows a condition wherein the throttle opening is 0%, that is, the accelerator opening is 0%, and FIG. 2b shows a condition wherein the throttle opening is 75%, that is, the accelerator opening is 75%. In the condition shown in FIG. 2b, there remains a distance between the levers 111 and 114, which is necessary for making the throttle opening vary from 75% to 100%. Thus, the levers 111 and 114 abut against each other when the throttle opening becomes 100%, that is, the accelerator opening becomes 100%.

Figure 2C:
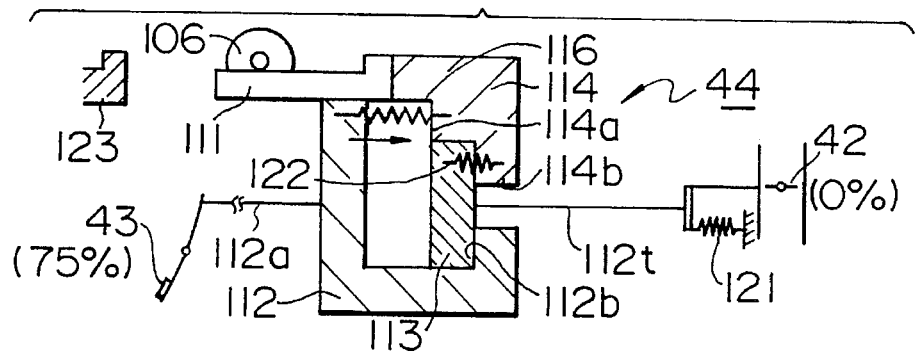
Figure 2D:
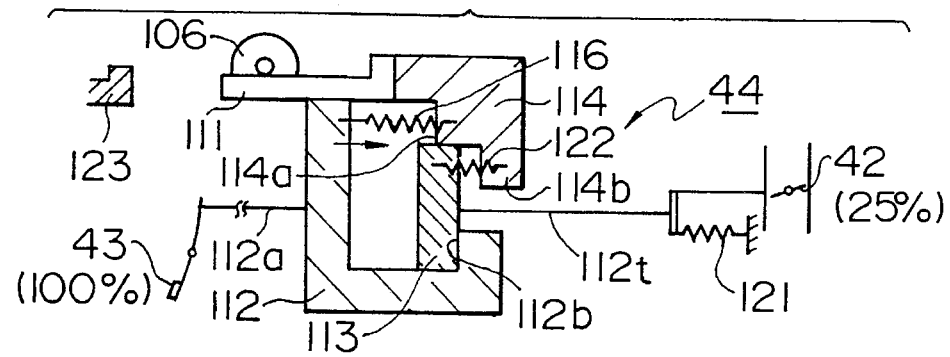

When the lever 111 is driven to the right by the motor 106 in the condition shown in FIG. 2b, the lever 114 is moved to the right against the spring 116 as shown in FIG. 2c. Thus, the throttle opening becomes small, while the accelerator opening remains as it is. In FIG. 2c, the throttle opening is 0%, that is, the throttle is completely closed, while the accelerator opening is 75%. In this condition, the abutting portion 112b of the lever 112 abuts against 20 the lever 113.

When the accelerator opening is made 100% in the condition shown in FIG. 2c, the lever 112 is moved to the left and, accordingly, the lever 113 is moved to the left by the abutting portion 112b. Thus, the throttle opening changes from 0% shown in FIG. 25 2c to 25% shown in FIG. 2d.

As is clearly understood from the above description, even if the lever 111 becomes stuck in the condition shown in FIG. 2c, the throttle valve 42 can be opened to an opening of 25% by making the accelerator opening 100%, so that the vehicle A can be driven to a repair shop.

In the brake control operation, by having the switching valve 34 switched to the full-closed position and the switching valve 32 switched to the full-opened position, the fluid pressure supplying conduit 28 increases the line pressure in the brake conduits 23RR, 23RL. Then the line pressure is maintained by switching the switching valves 36R, 36L to the closed position, or releasing the line pressure by switching the switching valves 37RR, 37RL to the open position.

Figure 3:
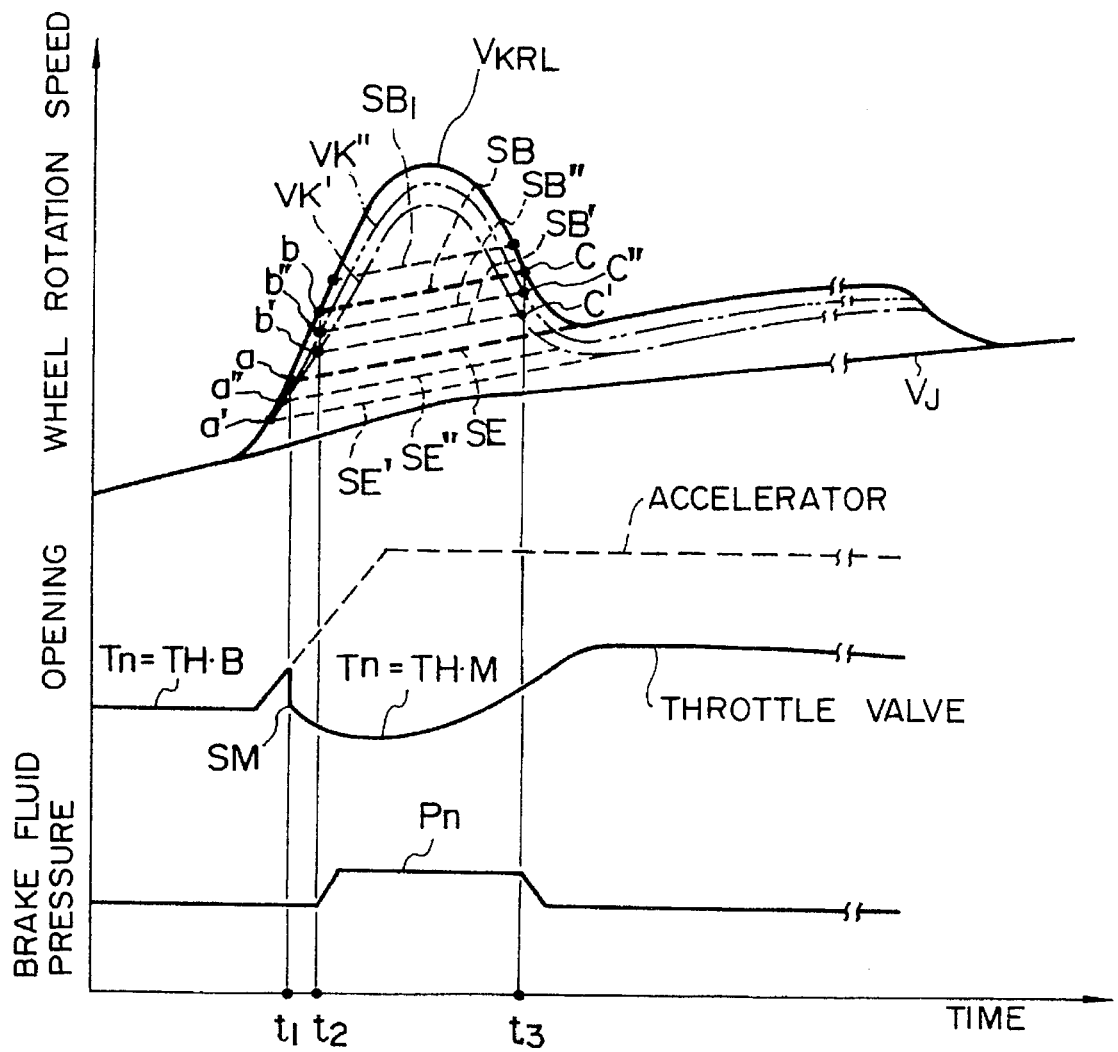
FIG. 3 is a time chart showing the outline of the slip control.
Figure 4:
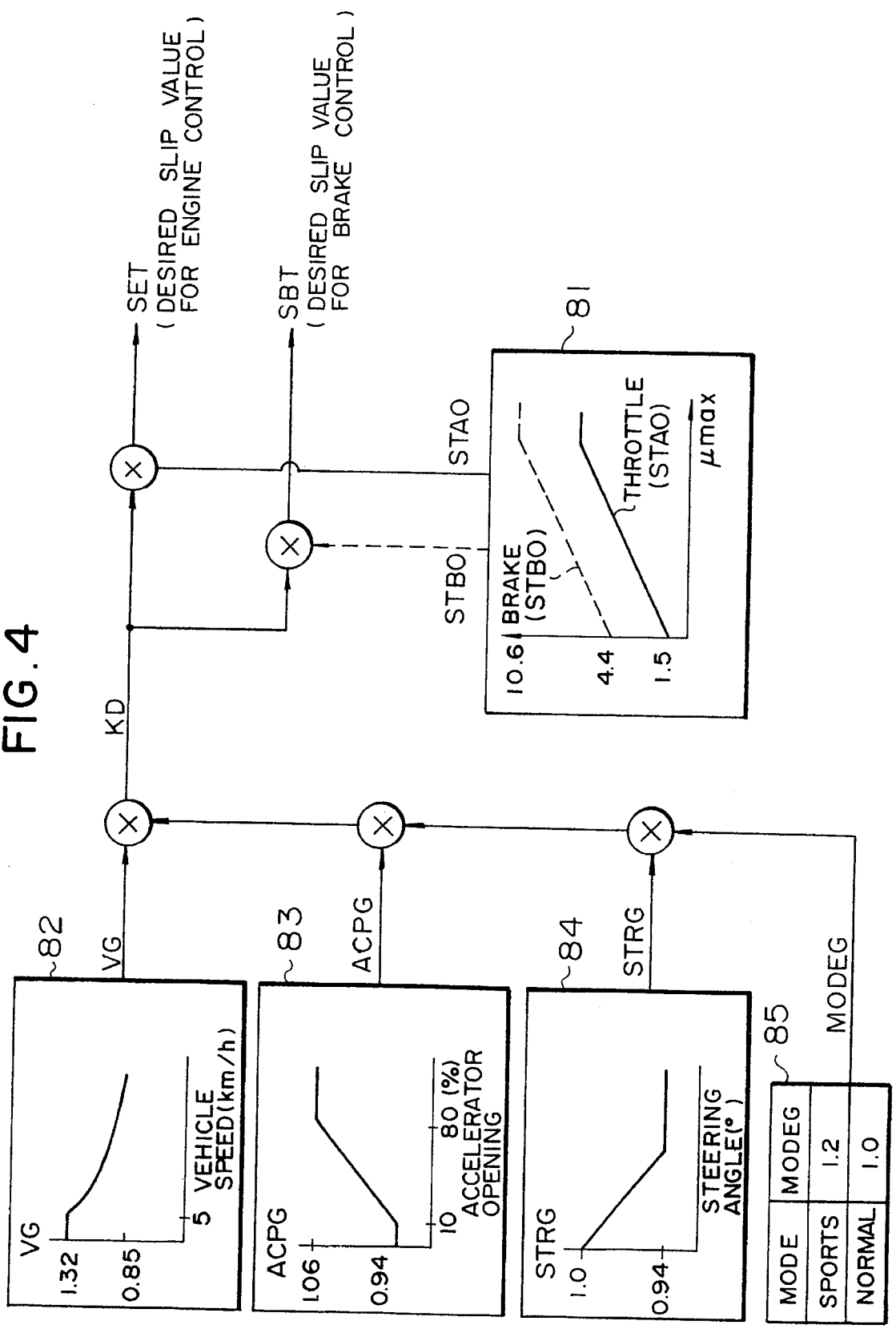
FIG. 4 is a block diagram showing a circuit which determines a desired slip value for the brake control operation and a desired slip value for the engine control operation for setting both desired slip values for the rear wheels.
Figure 5:
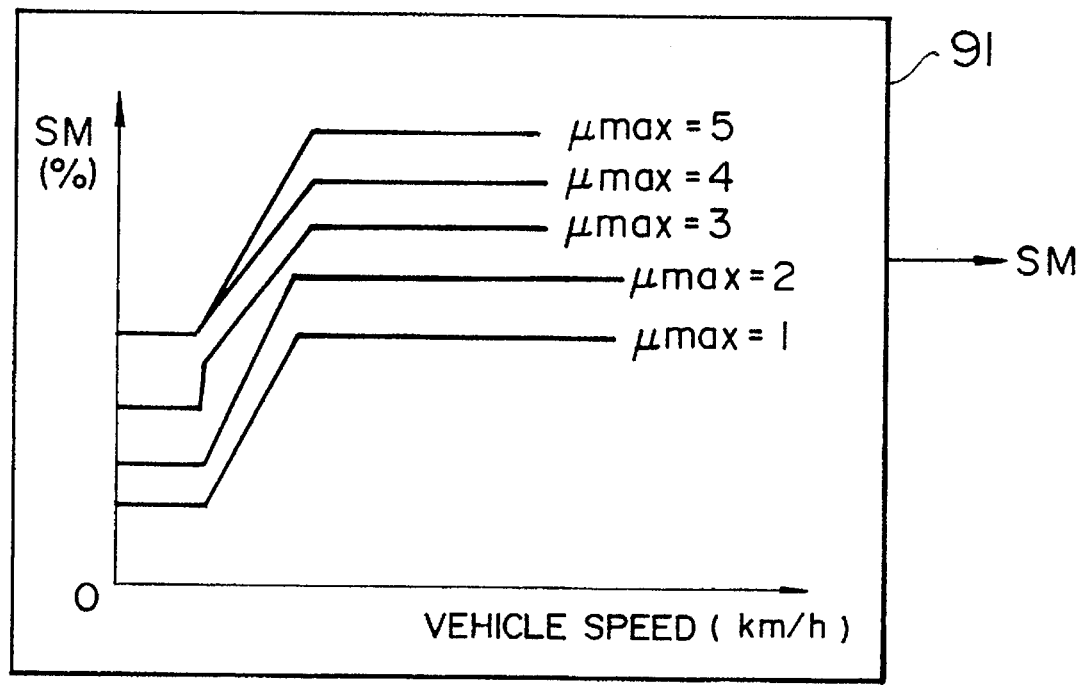
FIG. 5 is a diagram showing the lower limit of the throttle opening as determined by the traction control system.

FIG. 3 is a time chart which shows a relationship between the general vehicle wheel rotation characteristic of the rear wheels in the traction control operation, and the engine control operation and brake control operation by the traction control system. FIG. 4 is a block diagram showing a circuit determining a desired slip value for the brake control operation and a desired slip value for the engine control operation to set both desired slip values of the rear wheels. FIG. 5 is a diagram showing the lower limit of the throttle opening determined by the traction control system.

FIG. 3 shows the general vehicle wheel rotation characteristic of the driving wheel, for example, the rear left wheel 1RL, in the traction control operation. The other driving wheel or rear right wheel 1RR has substantially the same characteristic as the rear left wheel 1RL.

In FIG. 3, $V_{KR\,L}$ shows the wheel rotation speed of the driving wheel or the rear left wheel 1RL in the slip control operation, and $V_J$ shows the wheel rotation speed of the driven wheel or the average value of the front wheels 1FR, 1FL. A threshold a and a threshold b are shown. The threshold a corresponds to a basic desired slip ratio SE employed in the engine control operation which controls the slip ratio of the rear wheel 1RL by controlling the opening of the throttle valve. The threshold b corresponds to a basic desired slip ratio SB employed in the brake control operation which controls the slip ratio of the rear wheel 1RL by controlling the pressure of the brake fluid. The threshold b is set larger than the threshold a.

The slip ratio $S_{RL}$ of the rear wheel 1RL is calculated as follows:

$$\text{Slip Ratio } S_{RL} = \frac{V_{KR\,L} - V_J}{V_{KR\,L}}$$

The basic desired slip ratios SE, SB are calculated respectively as follows:

$$SE = \frac{SET}{V_J}$$

$$SB = \frac{SBT}{V_J}$$

where SET and SBT represent, respectively, a desired slip value for the engine control operation and a desired slip value for the brake control operation, both which are set in the rear wheels 1RL, 1RR in common.

The desired slip value SET for the engine control operation and the desired slip value SBT for the brake control operation are set so that the rear wheels 1RL, 1RR obtain the predetermined driving force mainly when the vehicle is running straight. Specifically, the desired slip values SET and SBT are determined based on parameters such as the maximum friction coefficient μmax of the road surface, the vehicle speed, the accelerator opening, the steering angle, and the running mode selected by the mode selecting switch 70 as shown in FIG. 4.

As shown in FIG. 4, the control unit UTR has a map 81 in which a basic value STBO of the desired slip value SBT and a basic value STAO of the desired slip value SET are stored, respectively, and which have parameters which are set by the larger one of the slip ratios $S_{RL}$, $S_{RR}$ of the respective rear wheel and the maximum friction coefficient μmax of the road surface, which is estimated based on the driving wheel rotation speed $V_J$. In the map, the basic value STBO is set to a larger value than the basic value STAO. The desired slip values SET and SBT mentioned above are obtained, respectively, by multiplying the basic values STAO, STBO by a correction gain KD. The correction gain KD is obtained by multiplying a gain coefficient VG by gain coefficients ACPG, STRG, MODEG. The gain coefficient VG is provided so as to obtain vehicle stability in accordance with an increase of the vehicle speed and is given by a map 82 as a function of the vehicle speed. The gain coefficient ACPG is provided so as to obtain a driving force in accordance with an acceleration demand of the driver and is given by a map 83 as a function of the accelerator opening. The gain coefficient STRG is provided so as to obtain stability of the vehicle in a steering operation and is given by a map 84 as a function of the steering angle. The gain coefficient MODEG is given by a table 85 and is manually selected from two modes, i.e., a sports mode and a normal mode, by the driver.

Referring back to FIG. 3, before the time $t_1$, the slip is small so that the throttle opening Tn is controlled under the basic throttle opening TH·B, which is proportional to the accelerator opening, by the lever 111 of the throttle opening control mechanism 44 being maintained at the position shown in FIG. 2A and FIG. 2B. At this time, the pressures of the brake fluid supplied to the brakes 21FR 21RL are decreased by switching valves 32, 34, 36R, 36L and 37FR 37RL being maintained at respectively normal positions.

At the time $t_1$, when the driving wheel rotation speed $V_{KRL}$ 15 increases to the threshold a of the basic desired slip ratio SE, the engine control operation of the slip control system is started. In the engine control operation, the traction control system in the slip control unit UTR carries out a feedforward control so as to drop the throttle opening down to a lower limit control value SM by moving the lever 111 of the mechanism 44 forwardly by the motor 106.

Referring to FIG. 5, the lower limit control value SM of the throttle opening is stored in a map having parameters which are the vehicle speed and the maximum friction coefficient μmax of the road surface, and is determined based on those parameters. The maximum friction coefficient μmax varies from 1 to 5, where the smallest is equal to 1 and the largest is equal to 5. When the road surface has relatively small maximum friction coefficient μmax, a relatively large lower limit control value SM is provided so as to decrease the output of the engine 2 rapidly. When the road surface has relatively large maximum friction coefficient μmax, a relatively small lower limit control value SM is provided so as to prevent the vehicle from stalling caused by the overreduction of the output of the engine 2.

After the throttle opening is dropped to the lower limit control value SM, the traction control system carries out a feedback control of the opening of the throttle valve 42 so that the slip ratio $S_{RL}$ of the rear wheel 1RL becomes the desired slip ratio SE for the engine control operation. The feedback control is carried out by controlling the rotation of the motor 106 in the mechanism 44 so that the throttle opening is controlled under TH·M as shown in FIG. 3.

Referring back to FIG. 3, after the time $t_1$, the driving wheel rotation speed $V_{KR\ L}$ of the rear wheel 1RL is still increasing against the driven wheel rotation speed $V_J$, while the engine control is operated. At the time $t_2$, the driving wheel rotation speed $V_{K\ RL}$ increases to the threshold b of the basic desired slip ratio SB. At this time, the brake control operation of the traction control is started so that the slip ratio $S_{RL}$ of the rear wheel $1_{RL}$ is equal to the basic desired slip ratio SB. Namely, in the brake control operation, the slip control unit UTR of the traction control system controls the switching valves 32, 34, 36RR, 36RL so that the brake fluid pressure of the brake 21RL of the rear wheel 1RL is increased to the pressure $Pn_{RL}$ and then the pressure $Pn_{RL}$ is maintained.

After the time $t_1$ both engine control and brake control are operated to decrease the slip of the rear wheel 1RL. When the driving wheel rotation speed $V_{KR\ L}$ is decreased under the threshold c of the basic desired slip ratio SB for the brake control at the time $t_3$, the slip control unit UTR stops the brake control operation by opening the switching valve 37RL and decreasing the brake fluid pressure, while the engine control operation is still being carried out until the slip ratio $S_{RL}$ has no possibility of increasing or the acceleration opening is reduced to zero.

While the driving force of the rear wheel 1RL generally has a tendency to increase up to the predetermined value with a rise in the slip ratio, the cornering force of the rear wheel 1RL generally has a tendency to decrease with a rise in the slip ratio. Therefore, the vehicle becomes unstable with a rise in the slip ratio. In accordance with an embodiment of the invention, respective basic desired slip ratios SE, SB of the engine control and brake control are corrected to smaller values based on the signals from the steering sensor 69 and the yawing rate sensor 74. When the yawing rate sensor 74 detects a yawing rate which is larger than a predetermined a value and the steering sensor 69 detects an angular steering amount which is smaller than a predetermined value, or the vehicle is in relatively unstable steering condition, the basic desired slip ratios SE, SB are corrected to first desired slip ratios SE', SB', respectively. When the yawing rate sensor 74 detects yawing rate which is larger than predetermined value and the steering sensor 69 detects an angular steering amount which is larger than a predetermined value, or the vehicle is in a relatively stable steering condition, the basic desired slip rations SE, SB are corrected, respectively, to second desired slip ratios SE", SB", which are larger than the first desired slip ratios SE', SB'.

When the vehicle is in relatively unstable steering condition, the traction control operation is started in a relatively early stage when the slip ratio $S_{RL}$ of the rear wheel 1RL is equal to the threshold a', b' of the first desired slip ratios SE', SB'. In the traction control operation, the output of the engine 2 and the brake fluid pressure are controlled so that the slip ratio $S_{RL}$ is equal to the first desired slip ratios SE', SB'. The slip ratio $S_{RL}$ of the rear wheel 1RL is controlled in the relatively early stage, which is understood from the driving wheel rotation speed $V_{KR\ L}'$ represented as an alternately long and short dashed line in FIG. 3.

When the vehicle is in a relatively stable steering condition, the traction control operation is started later than the starting time in the case of the first desired slip ratios SE', SB' at the time of the slip ratio $S_{RL}$ of the rear wheel 1RL being equal to the threshold a", b" of the second desired slip ratios SE", SB". In the traction control operation, the output of the engine 2 and the brake fluid pressure are controlled so that the slip ratio $S_{RL}$ is equal to the second desired slip ratios SE", SB". The slip ratio $S_{RL}$ of the rear wheel 1RL is controlled so as to be restrained a little bit in comparison with when the vehicle is running straight. This is understood from the driving wheel rotation speed $V_{KR\ L}"$ illustrated as an alternate long and two short dashed line in FIG. 3.

The rear right wheel 1RR has the same wheel rotation characteristic at the time of the traction control operation as that of the rear left wheel 1RL described above and shown in FIG. 3.

When the friction coefficients of the road surfaces of the rear right wheel 1RR and rear left wheel 1RL are different from each other, and the slip of the rear right wheel 1RR or rear left wheel 1RL is increased in an early stage, the engine control operation is started at the time the slip ratio $S_{RR}$ or $S_{RL}$ of the wheel 1RR or 1RL becomes equal to the desired slip ratio SE, SE', SE" for the engine control. The brake control operation is carried out in the rear right wheel and rear left wheel independently. Therefore, when the slip ratio of the respective rear wheel 1RR, 1RL is equal to the desired slip ratio SB, SB', SB" for the brake control, the brake control operation in the rear wheel having slip ratio is equal to the desired slip ratio is started.

The slip control and engine control by the slip control unit UTR will be described hereinafter in detail with reference to the flow charts shown in FIGS. 6 through 9.

Figure 6:
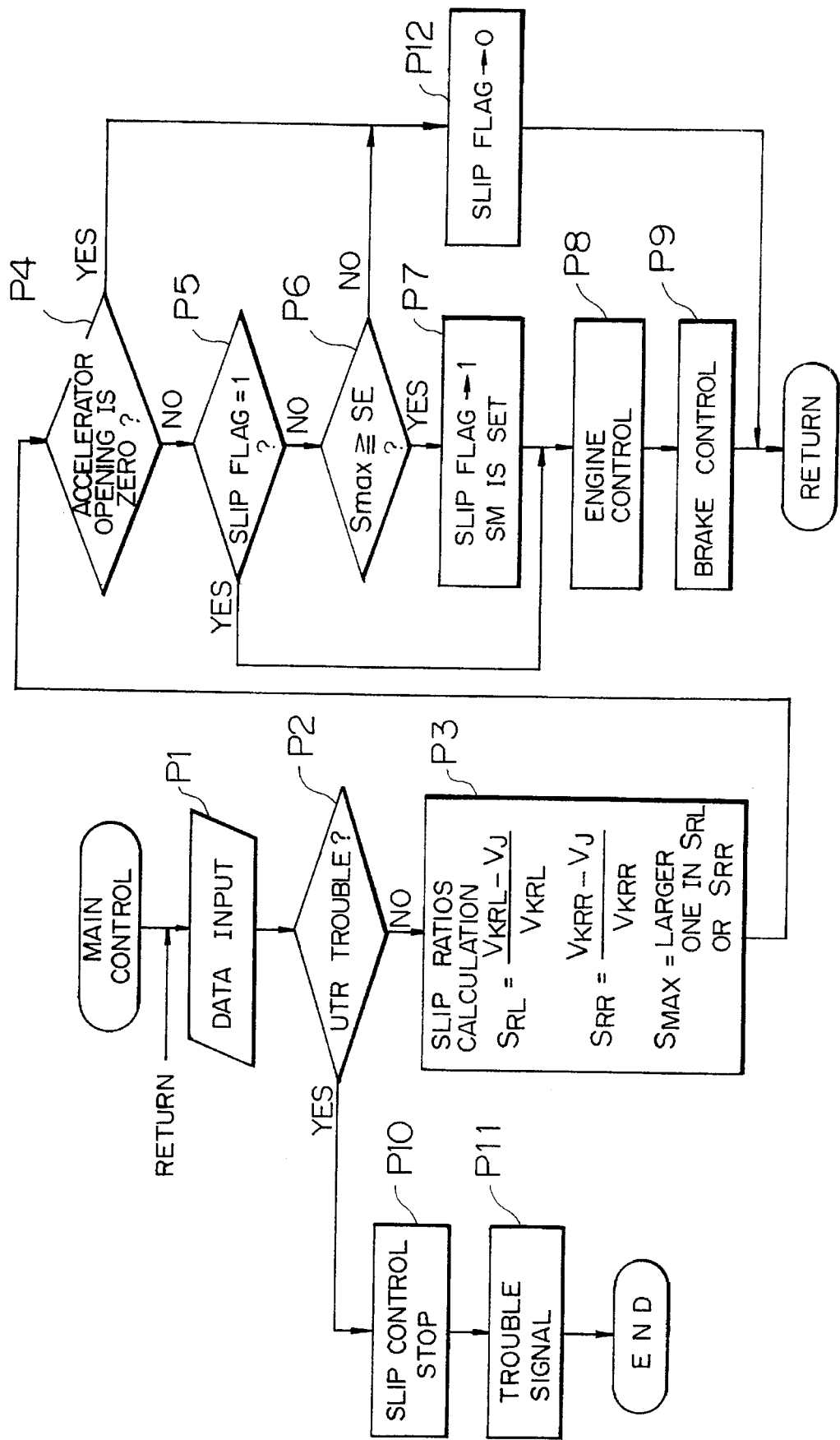
FIG. 6 is a flow chart showing a main control of the traction control operation in the slip control unit UTR.
Figure 7:
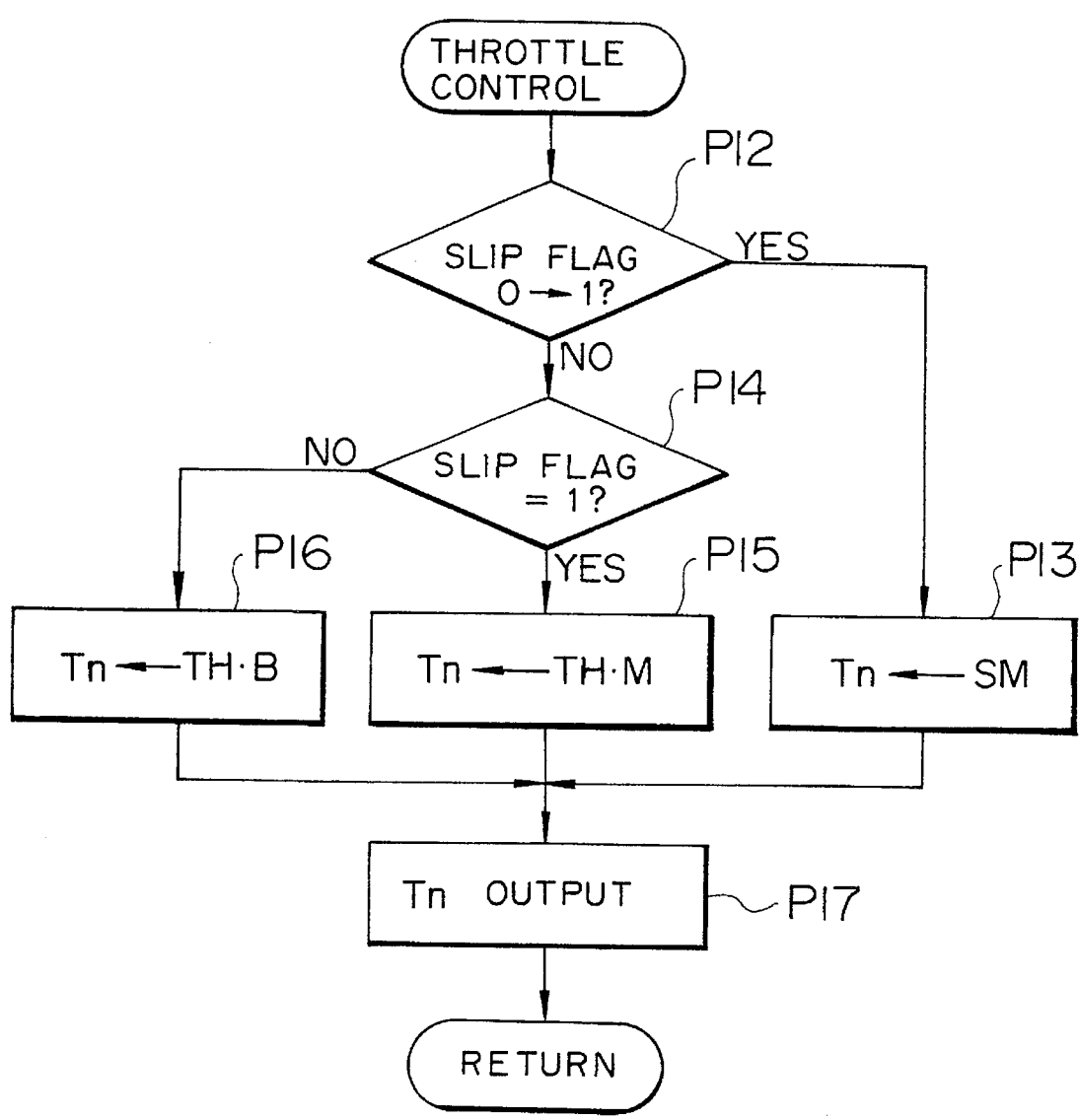
FIG. 7 is a flow chart showing an engine control operation in the slip control unit UTR.
Figure 8:
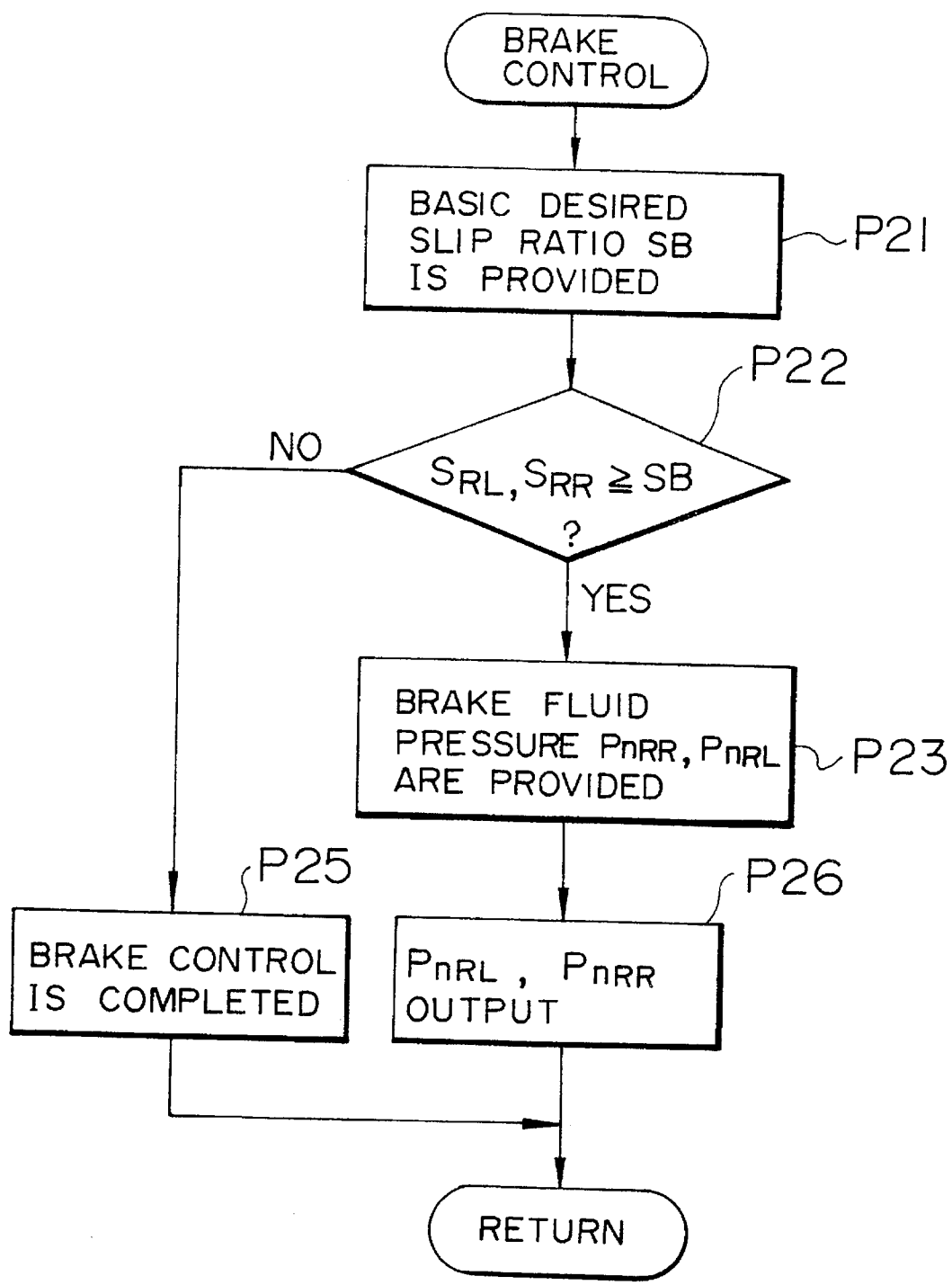
FIG. 8 is a flow chart showing a brake control operation in the slip control unit UTR.
Figure 9:
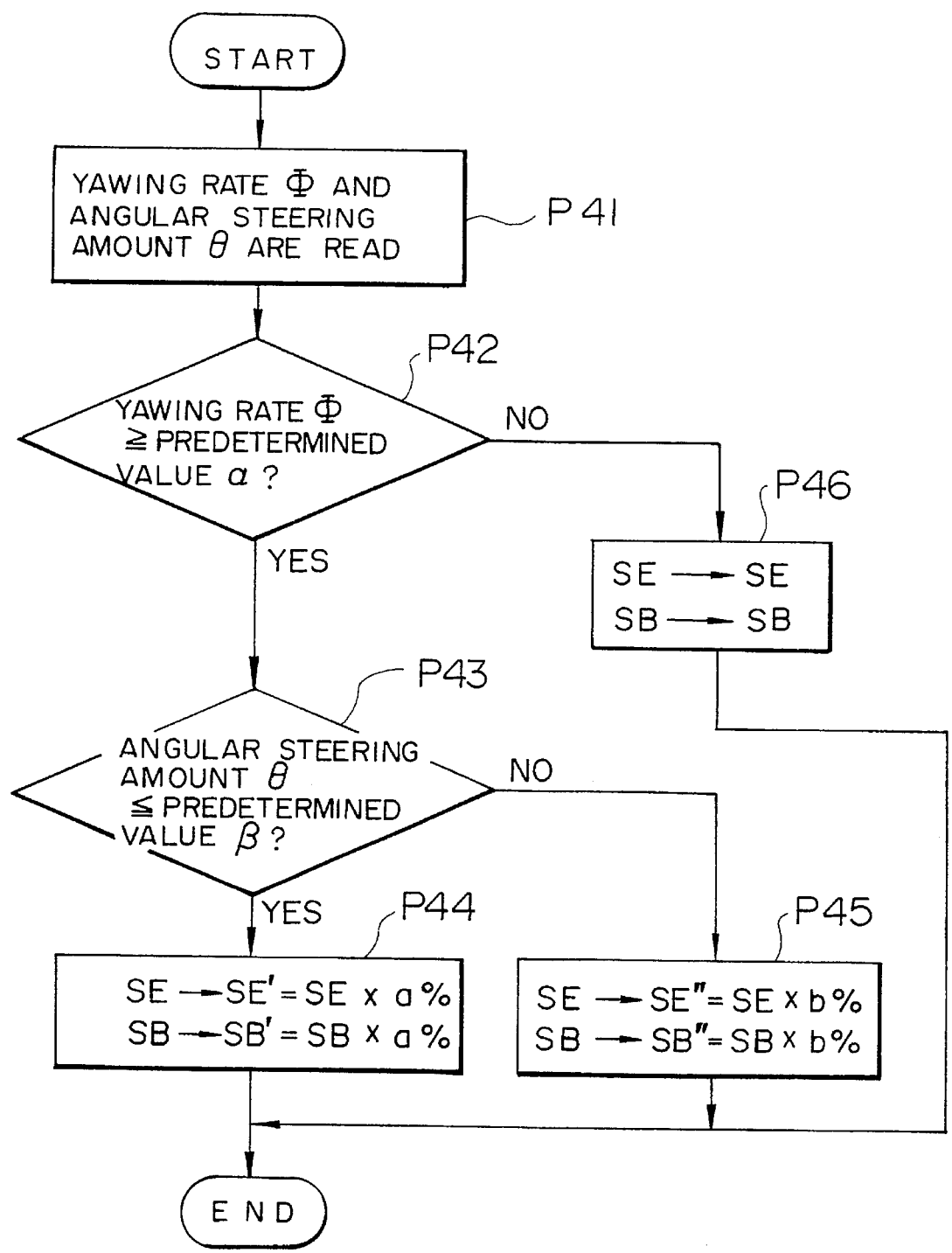
FIG. 9 is a flow chart showing how the desired slip ratio is corrected in accordance with the first embodiment of the present invention.

FIG. 6 is a flow chart showing a main control of the traction control operation in the slip control unit UTR. FIG. 7 is a flow chart showing an engine control operation in the slip control unit UTR. FIG. 8 is a flow chart showing a brake control operation in the slip control unit UTR. FIG. 9 is a flow chart showing how the desired slip ratio is corrected. The reference letter P indicates a step in the flow charts in FIGS. 6 through 9.

The main control of the traction control operation by the slip control unit UTR will be described with reference to FIG. 6.

First, the signals from the sensors such as the throttle sensor 61, the vehicle speed sensor 62, the wheel rotation speed sensors 63, 64, 65, 66, the acceleration opening sensor 67, the motor rotation amount sensor 68, the manual switch 70 for selecting slip control modes, the brake switch 71, the G sensor 73, and the yawing rate sensor 74 are input (P1).

Then, it is judged whether the control unit UTR has any 5 trouble or not (P2).

If the control unit UTR has no trouble, based on the wheel rotation speed signals from the sensors 63–66, the slip ratios $S_{RR}$, $S_{RL}$ of the rear wheels 1RR, 1RL are calculated respectively by employing the driving wheel rotation speeds $V_{KR\ R}$, $V_{KR\ L}$ of the driving wheels or the rear wheels 1RR, 1RL and the driven wheel rotation speed $V_J$ which is an average value of the driven wheels or the front wheels 1FR, 1RL (P3).

Then, based on the signal from the acceleration opening sensor 67, it is judged whether the accelerator opening is zero or not (P4). When the accelerator opening is not zero, a slip ratio $S_{MAX}$, which is a larger one of the actual slip ratios $S_{RR}$, $S_{RL}$ of the driving wheels, is compared with the basic desired slip ratio SE for the engine control. When the slip ratio $S_{MAX}$ is more than or equal to the basic desired slip ratio SE, the throttle opening Tn is set at the lower limit control value SM (P6, P7) and the engine control operation is carried out (P8).

Referring to FIG. 7, when it is judged that the slip ratio $S_{MAX}$ is equal to the basic desired slip ratio SE for the engine control by the rise of the slip ratio (P12), the throttle opening Tn is dropped down to the lower limit control value SM by controlling the opening of the throttle valve 42 by the motor 106 in the mechanism 44 (P13, P17).

After the opening of the throttle valve 42 is decreased to the lower limit control value SM, the throttle opening Tn is provided as the throttle opening TH–M so that the slip ratio of the rear wheels 1RR, 1RL are equal to the basic desired slip ratio 5 SE (P15).

Referring to FIG. 8, while the engine control operation is carried out, the slip control unit UTR provides the basic desired slip ratio SB for the brake control operation (P9 in FIG. 6, P21). Even though the engine control operation is carried out, when the slip ratios $S_{RR}$, $S_{RL}$ of the rear wheels 1RR, 1RL increase and are equal to the basic desired slip ratio SB, the brake fluid pressures $Pn_{RR}$, $Pn_{RL}$ in the brakes 21RR, 21RL are provided so that the slip ratios $S_{RR}$, $S_{RL}$ of the rear wheels 1RR, 1RL are equal to the basic desired slip ratio SB (P22, P23). Based on values of the brake Fluid pressure $Pn_{RR}$, $Pn_{RL}$, the switching valves 32, 34, 36R, 36L, 37RR, 37RL are controlled. The switching valve 32 is switched to the opened position, the switching valve 34 is switched to the closed position, and the switching valves 36R, 36L, 37RR, 37RL are controlled so that the brake fluid pressure in the brakes 21RR, 21RL is equal to the above-mentioned brake fluid pressure $Pn_{RR}$, $Pn_{RL}$ (P26). Thus by controlling the brake fluid pressure, the slip ratios $S_{RR}$, $S_{RL}$ of the rear wheels 1RR, 1RL is decreased. When the slip ratios $S_{RR}$, $S_{RL}$ are under the basic desired slip ratio SB, the brake control operation for the rear wheels 1RR, 1RL is completed (P22, P25) and then the brake fluid pressure in the rear wheels 1RR, 1RL is released.

Referring to FIG. 9, the slip control unit corrects the basic desired slip ratios SE, SB based on the yawing rate and the angular steering amount of the vehicle.

The yawing rate Φ detected by the yawing rate sensor 74 and the angular steering amount θ detected by the steering sensor 69 are read (P41). When the detected yawing rate Φ is more than or equal to the predetermined value α, and the detected angular steering amount θ is less than or equal to the predetermined value β, the basic desired slip ratios SE, SB are corrected, respectively, to the first desired slip ratios SE', SB' which are obtained by decreasing the basic desired slip ratios SE, SB to a predetermined ratio (a % which is less than 100%) (P42, P43, P44).

When the detected yawing rate Φ is more than or equal to the predetermined value α, and the detected angular steering amount θ is more than or equal to the predetermined value β, the basic desired slip ratios SE, SB are corrected respectively to the second desired slip ratios SE", SB" which are more than the first desired slip ratios SE', SB' and which are obtained by decreasing the basic desired slip ratios SE, SB to predetermined ratio (b % which is less than 100% and more than a %) (P42, P43, P45).

When the detected yawing rate Φ is less than the predetermined value α, the vehicle is substantially in the condition of running straight. Therefore, the slip control unit UTR does not correct the basic desired slip ratios SE, SB and carries out the engine control operation and the brake control operation based on the basic desired slip ratios SE, SB (P42, P46).

Referring back to FIG. 6, in the main control, the control unit UTR has may have some trouble in which the memory devices incorporated in the control unit UTR. That is, data may not be able to be read out from ROM, data read out from ROM may be wrong, data may not be able to be written into RAM, or data read out from RAM may be wrong, and/or the slip control operation may be stopped. At that time, the pressurized brake fluid pressure by the brake control operation is released, the throttle opening corresponding to the accelerator opening is obtained and, further, a trouble signal is sent by using lamps, buzzers or the like (P10, P11).

When the acceleration pedal is released and the accelerator 10 opening is in the closed position, the main control is completed (P12).

In the embodiment mentioned above, when the slip ratios of the rear wheels 1RR, 1RL are equal to the basic desired slip ratios SE, SB in the steering operation, the slip control unit UTR controls the driving forces transmitted to the rear wheels 1RR, 1RL so that the slip ratios are less than the basic desired slip ratios SE, SB, and further corrects the basic desired slip ratios SE, SB into smaller values based on the detected values from the yawing rate sensor 74 and the steering sensor 69. Therefore, the stability of the vehicle in the steering operation can be improved by controlling the slip in the driving wheels 1RR, 1RL more than when vehicle being is straight.

When the yawing rate sensor 74 detects a yawing rate which is more than or equal to the predetermined value, and the steering sensor 69 detects an angular steering amount which is less than or equal to the predetermined value, the slip control unit UTR corrects, respectively, the basic desired slip ratios SE, SB to the first desired slip ratios SE', SB'. When the yawing rate sensor 74 detects a yawing rate Φ which is more than or equal to the predetermined value, and the steering sensor 69 detects an angular steering amount θ which is more than or equal to the predetermined value, the slip control unit UTR corrects, respectively, the basic desired slip ratios SE, SB to the second desired slip ratios SE", SB" which are more than the first desired slip ratios SE', SB'. Therefore, when the vehicle is in a relatively unstable condition because the steering condition is much larger than that in 10 which the driver steers actually, the slip of the rear wheels is controlled so much and then the stability of the vehicle can be obtained. When the vehicle is steered in a large curvature by the driver in relatively stable condition, the stability of the vehicle can be obtained with no excessive slip control operation and no loss of drivability.

Hereinafter, there is described a second embodiment of the invention. In the first embodiment mentioned above, the brake control operation is carried out in the rear right wheel and rear left wheel independently. However, in the second embodiment, when the 20 vehicle is in a steering operation, the brake control operation is switched to the select-low type right and left integrated brake control operation in which the rear right wheel and rear left wheel are controlled equally based on the rear wheel contacting the road surface whose friction coefficient is lower than the other. Consequently, in a steering operation, the vehicle can obtain a much greater stability than on the right and left independent control operation in the first embodiment.

In the select-low type right and left integrated brake control operation, when either one of the slip ratios $S_{RR}$, $S_{RL}$ of the rear wheels 1RR, 1RL is equal to the desired slip ratio SB, the brake fluid pressure in the rear wheels 1RR, 1RL is increased equally to the pressure Pn so that the slip ratio is less than the desired slip ratio. For example, when the slip ratio $S_{RL}$ of the rear left wheel 1RL is equal to the desired slip ratio SB, the traction control system controls the switching valves 32, 34, 36R, 36L, 37RR, 37RL to increase the brake fluid pressure of the both rear wheels 1RR, 1RL to the pressure Pn and maintain the pressure Pn so that the slip ratio of the rear left wheel 1RL is less than the desired slip ratio SB.

Figure 10:
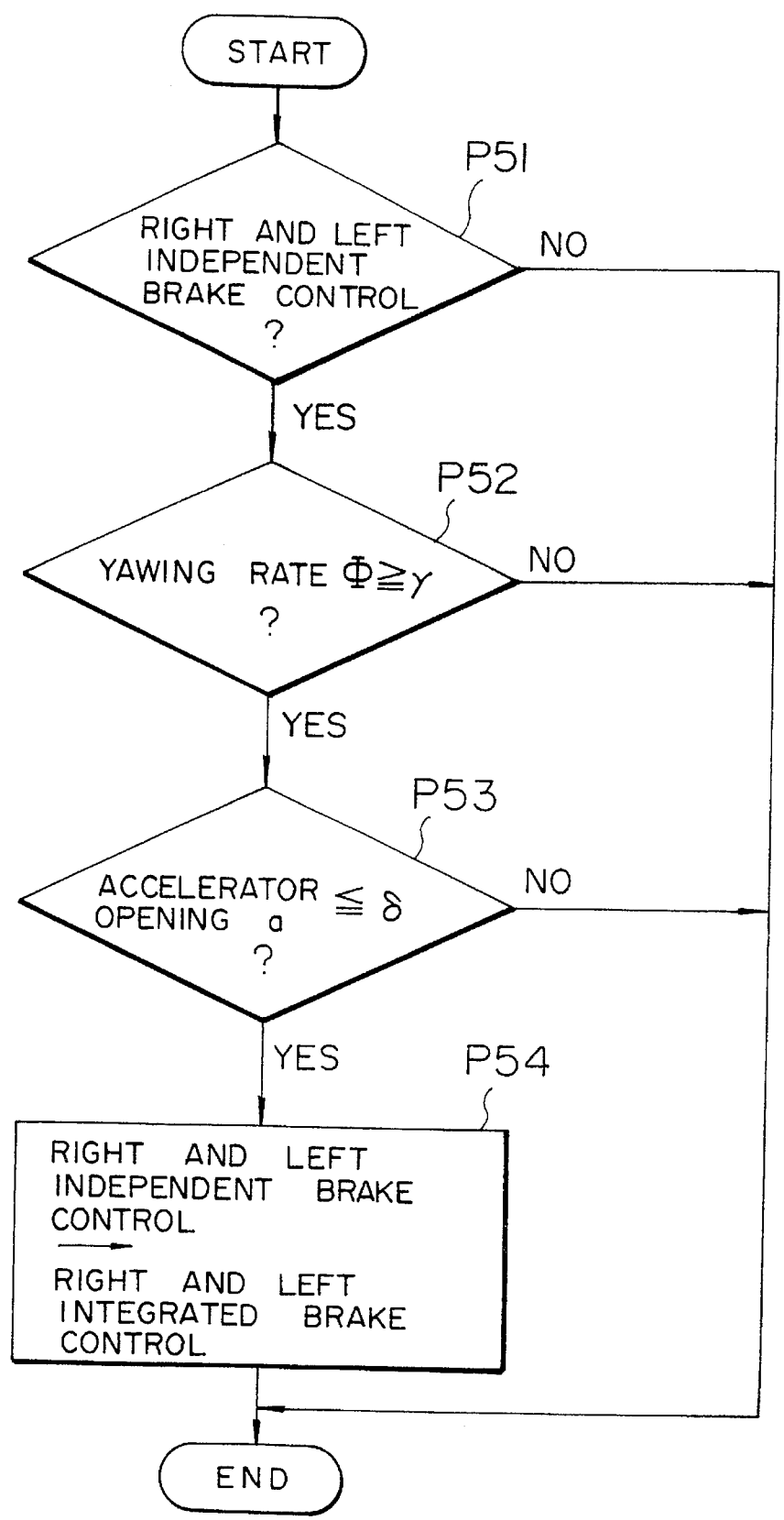
FIG. 10 is a flow chart showing the switching operation from the right and left independent brake controls to the right and left integrated brake controls in accordance with a second embodiment of the present invention.

Referring to FIG. 10, there is shown a flow chart showing the switching operation from the right and left independent brake control to the right and left integrated brake control.

When the traction control system is carried out by the right and left independent brake control in the brake control operation (P51), and a yawing rate Φ which is larger than the predetermined value Y is detected by the yawing rate sensor 74, the brake control operation is switched from the right and left independent brake control operation to the right and left integrated brake control operation (P52, P54).

At this time, when the accelerator opening which is larger than the predetermined value δ is detected by the accelerator opening sensor 67 because the driver depresses the pedal to a large degree, the brake control operation is not switched to the right and left integrated brake control operation but continues in the right and left independent brake control operation so as to obtain good drivability (P53). The vehicle obtains good acceleration performance by maintaining the driving force of the driving wheel having a slip which is smaller.

In accordance with the second embodiment of the invention, because the driving forces of the rear right and left wheels 1RR, 1RL are decreased equally in the steering operation, the slips in the rear wheels are controlled with no difference between the rear right and left wheels so that the vehicle can obtain stability in the steering operation.

Further, when the slip ratio of the rear wheel 1RR or 1RL contacting the road surface having a friction coefficient which is relatively low is equal to the desired slip ratio in the early stage, the brake fluid pressure is increased equally to the pressure Pn by the select-low type right and left integrated brake control operation. Consequently, the slips in the rear wheels are decreased to less than the desired slip ratio rapidly and the stability of the vehicle can be improved.

Further, when the driver demands acceleration of the vehicle, the brake control operation is not switched to the right and left integrated brake control operation but continues in the right and left independent brake control operation. As a result, the vehicle can obtain good drivability.

In accordance with the second embodiment of the invention, instead of the select-low type right and left brake control, other types of right and left brake control may be employed in which the brake fluid pressures in the rear wheels 1RR, 1RL are controlled equally based on the average value of the slip ratios $S_{RR}$, $S_{RL}$ in the rear wheels.

Hereinafter, there is described a third embodiment of the invention referring to FIGS. 11 through 15.

Figure 11:
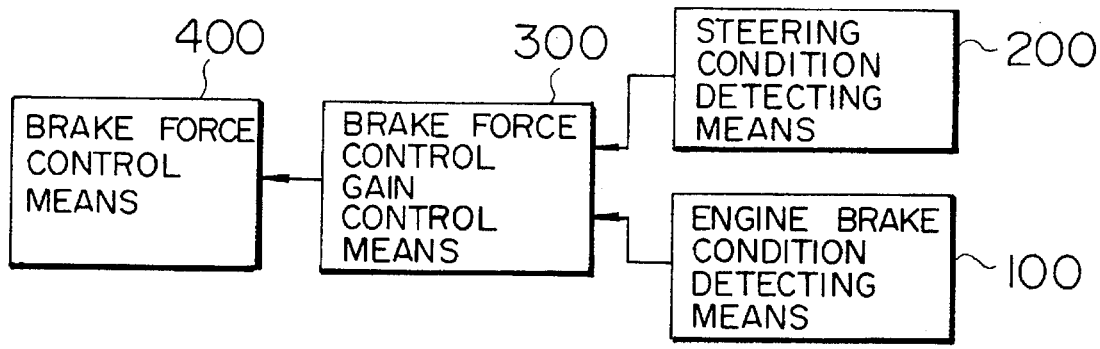
FIG. 11 is a block diagram of a slip control system for carrying out the slip control operation in accordance with a third embodiment of the present invention.
Figure 12:
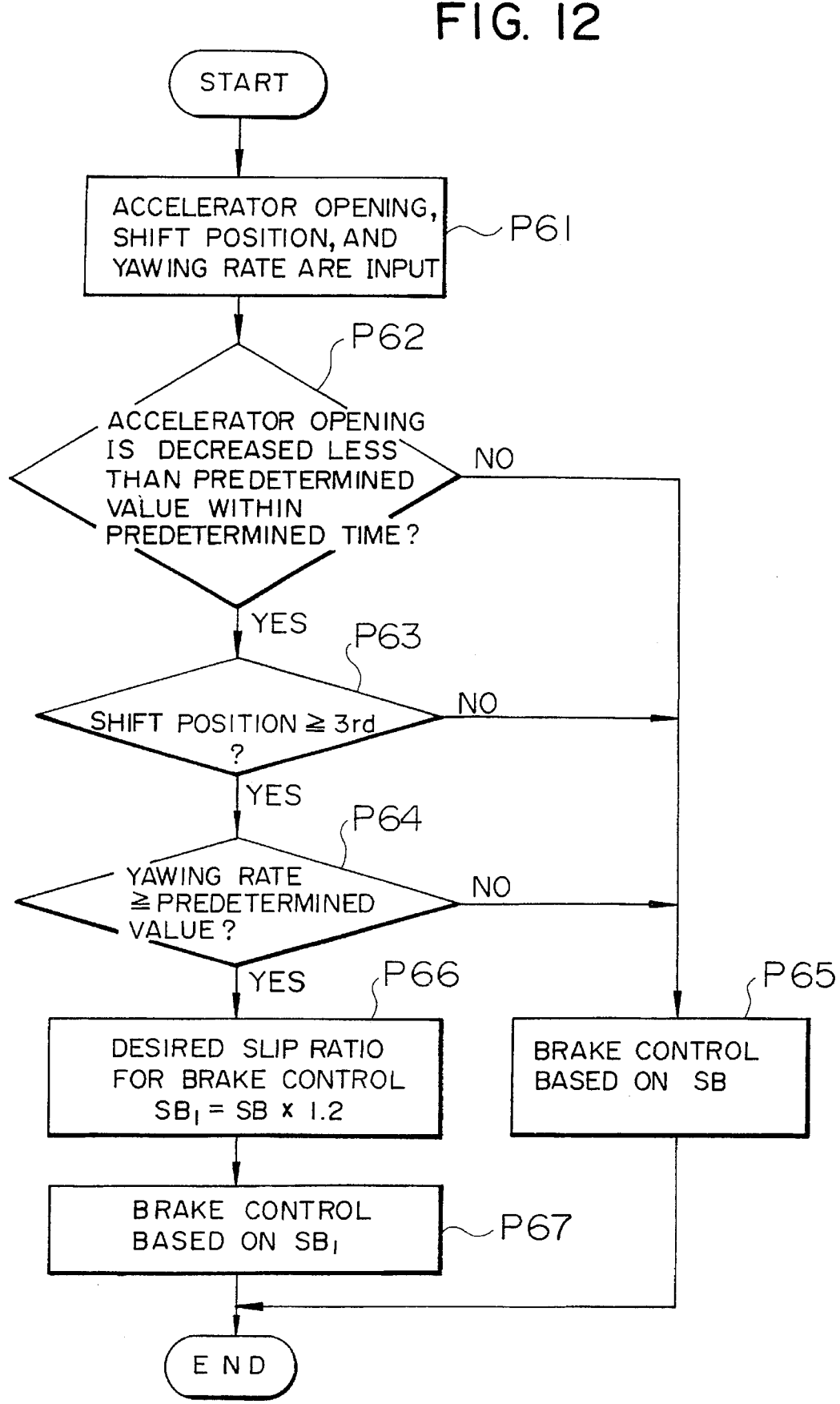
FIG. 12 is a flow chart showing the procedures in the brake control operation performed by the slip control system of FIG. 11.

FIG. 11 shows a block diagram of the slip control system carrying out the slip control operation in accordance with the third embodiment of the invention. FIG. 12 is a flow chart showing the procedures of the brake control operation performed by the slip control system in FIG. 11.

In the third embodiment of the invention, when the vehicle is in the steering operation and in the engine brake operation which is included in the low accelerator opening conditions, the desired slip ratio SB is controlled so as to be increased more than in the normal operation so as to decrease the brake control gain.

Referring to FIG. 11, the engine brake condition detecting means 100 includes the accelerator opening sensor 67, the shift position sensor 75 and the slip control unit UTR. The steering condition detecting means 200 includes the yawing rate sensor 74 and the slip control unit UTR. The brake force control gain control means 300 and the brake force control means 400 include the slip control unit UTR. In the normal condition, the brake control operation is carried out based on the desired slip ratio SB for the brake control. When both the engine brake condition and the steering condition are detected by the engine brake condition detecting means 100 and the steering condition detecting means 200, the brake force control gain control means 300 provides the desired slip ratio SBI (shown in FIG. 3) which is larger than the desired slip ratio SB employed in the normal condition, and further, the brake force control means 400 carries out the brake control operation based on the desired slip ratio $SB_1$.

Referring to FIG. 12, there is described a flow chart showing the procedures in the brake control operation by the slip control system in FIG. 11. First, the accelerator opening, the shift position, and the yawing rate are input to the slip control unit UTR (P61). The slip control unit UTR judges whether the accelerator opening is decreased less than the predetermined value within the predetermined time and further whether the shift position is more than or equal to 3rd position (P62, P63). When the answers are YES in both steps P62 and P63, the vehicle is in the engine brake condition. When the answer is NO in either step P62, P63, the vehicle is in non engine brake condition. Namely, a condition is present in which the accelerator opening is decreased less than the predetermined value within the predetermined time and, further, the shift position is more than or equal to the third position. This means that a condition in which the acceleration pedal is released rapidly in the high speed operation is present and, thereby, the engine brake is working. The negative condition mentioned above means a condition in which the engine brake is not working. Next, the slip control unit UTR judges whether the yawing rate is more than or equal to the predetermined value (P64). When the yawing rate is more than or equal to the predetermined value, the vehicle is in the steering condition. When the yawing rate is less than the predetermined value, the vehicle is not in the steering condition. Because the vehicle is in the normal condition when the answer is NO in step P62, P63 or P64, the brake control operation is carried out by the brake force control means 400 based on the desired slip ratio SB for the brake control (P65). Because the vehicle is in the engine brake condition and in the steering condition when all answers are YES in steps P62, P63 and P64, there is provided a desired slip ratio $SB_1$ ($SB_1$=SB×1.2) which is larger than the desired slip ratio SB (P66) and the brake control operation is carried out by the brake force control means 400 based on the desired slip ratio $SB_1$ (P67).

Figure 13:
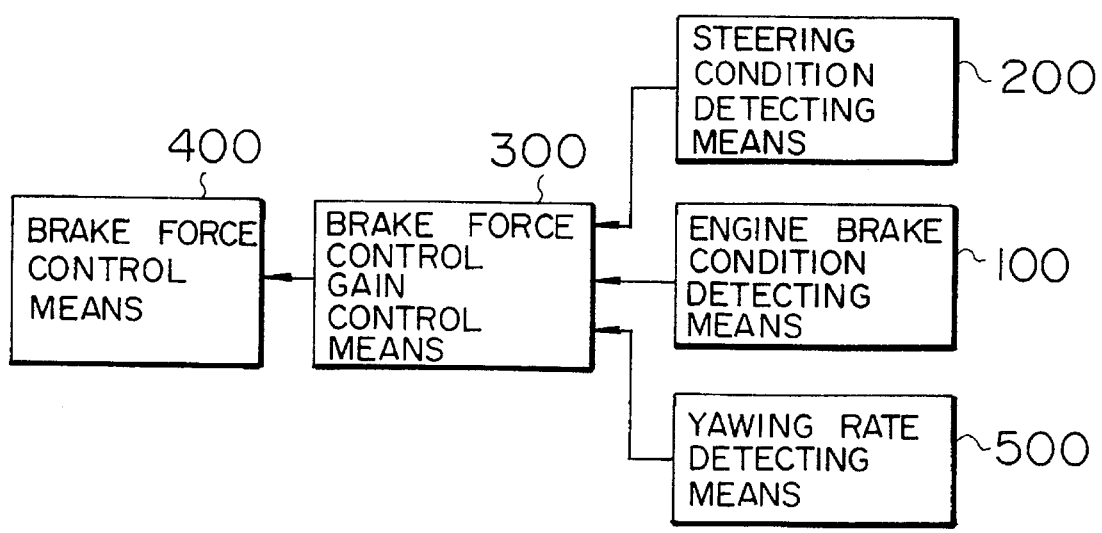
FIG. 13 is a block diagram of a slip control system for carrying out the slip control operation in accordance with another example of the third embodiment of the present invention.
Figure 14:
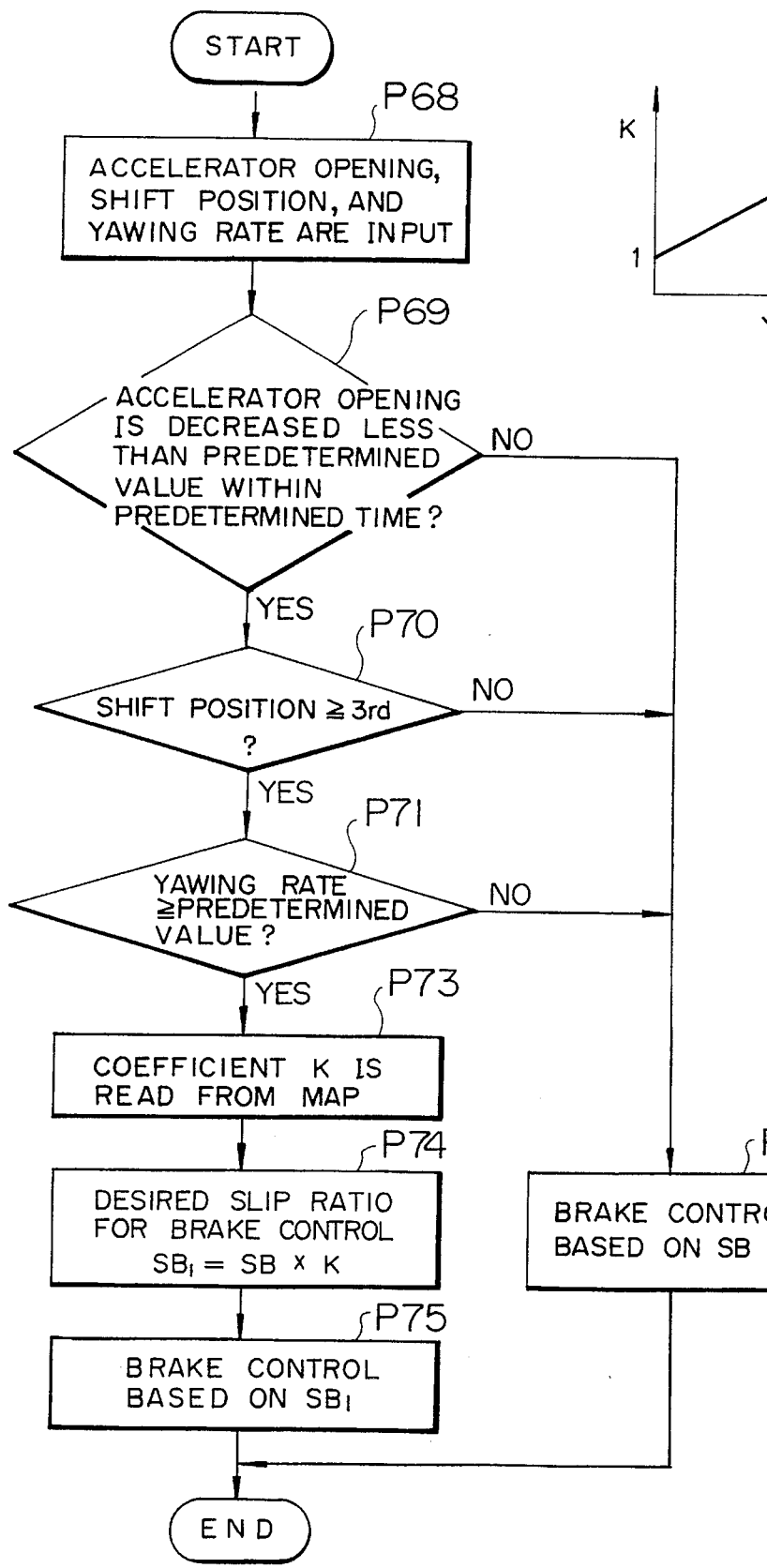
FIG. 14 is a flow chart showing the procedures in the brake control operation performed by the slip control system of FIG. 13.

FIG. 13 shows a block diagram of the slip control system carrying out the slip control operation in accordance with another example of the third embodiment of the invention. FIG. 14 is a flow chart showing the procedures carried out in the brake control operation by the slip control system in FIG. 13.

Referring to FIG. 13, the slip control system further includes a yawing rate detecting means 500 with the yawing rate sensor 74 in comparison with the system shown in FIG. 11. Specifically, the yawing rate detecting means 500 includes the yawing rate sensor 74 and, therefore, it shares one part of the brake force control means 400. In this embodiment, when the desired slip ratio SBI is provided by the brake force control gain control means 300 in the engine brake condition and in the steering condition, the larger the yawing rate is, or the more rapidly the steering operation is carried out, the larger a desired slip ratio $SB_1$ is provided becomes.

Figure 15:
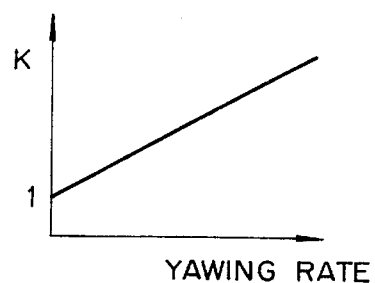
FIG. 15 is a diagram showing the relationship between a coefficient K and the yawing rate.

Referring to FIG. 14, there is described a flow chart showing the procedures in the brake control operation by the slip control system in FIG. 13. The brake control operation in FIG. 14 is substantially the same as the brake control operation in FIG. 12. The provision of the desired slip ratio $SB_1$ in the engine brake condition and in the steering condition is different. Namely, when all answers are YES in the steps P69, P70 and P71, the coefficient K is read in from the map in accordance with the amount of the yawing rate (P73), and the desired slip ratio $SB_1$ ($SB_1=SB\times K$) is determined by using the coefficient K (P74). FIG. 15 is a diagram showing the relationship between the coefficient K and the yawing rate. The larger the yawing rate is, the larger the coefficient K is, or the larger the desired slip ratio $SB_1$ is.

In the third embodiment of the invention mentioned above, the engine brake condition may be detected by other factors instead of the accelerator opening and the shift position. The steering condition may be detected by other factors such as the angular steering amount instead of the yawing rate.

In the third embodiment, the desired slip ratio $SB_1$ is increased so as to decrease the brake force control gain. The decrease of the brake force control gain corresponds to the decrease of the brake force. Therefore, this decrease may be employed to decrease the amount of the brake fluid in the brake control operation.

In the third embodiment, the steering condition may include a rapid steering condition in which the yawing rate is larger than the predetermined value.

Also, in the third embodiment, when the vehicle is in the steering condition and in the small accelerator opening condition, the brake force control gain in the brake control operation is decreased, or the brake forces in the driving wheels are decreased, so that the vehicle can be prevented from a decrease in the grip force of the driving wheels which is caused by the traction control. This can improve stability.

Further, in accordance with the third embodiment, by decreasing the brake force control gain based on the amount of the yawing rate, the vehicle can obtain a large grip force even in a rapid steering condition, because the more rapidly the steering operation is carried out, the more the brake force is decreased and, therefore, can the stability is improved much more.

Moreover, in the embodiments of the invention, the yawing rate of the vehicle may be detected by both the steering amount detected by the steering sensor and the vehicle speed detected by the speed sensor.

A vehicle with no ABS control system may utilize the invention.

In the engine control operation, the engine output may be decreased by the variable control of the ignition timing and/or the fuel cut of the engine. Further, a combination of this control operation, in which the engine output is decreased by the variable control of the ignition timing and/or the fuel cut of the engine, and the control operation in which the engine output is decreased based on the throttle opening described in the above embodiment may be employed.

The control of the throttle valve may be carried out by the stepping motor instead of the throttle opening control mechanism.

The slip ratio may be employed by other definitions which substantially correspond to the slip ratio.

What is claimed is:

1. A slip control system for a motor vehicle, having driving wheels and undriven wheels, which controls slips of the driving wheels comprising:

means for detecting a slip ratio of each driving wheel;

slip decreasing means for decreasing a slip of each driving wheel by controlling a driving force transmitted to the driving wheel so that the slip ratio of the driving wheel is at least equal to a predetermined desired slip ratio after the slip ratio of the driving wheel reaches a threshold for starting a slip control operation and then becomes greater than the threshold;

yawing rate detecting means for detecting an angular speed at which said vehicle moves around a vertical axis, defining a yawing rate of the vehicle; and steering amount detecting means for detecting a steering amount of steering wheels of the vehicle;

wherein said slip decreasing means includes correcting means for decreasing the desired slip ratio when the motor vehicle is determined to be in an unstable condition, based on both a comparison between a first predetermined value and the yawing rate detected by the yawing rate detecting means and a comparison between a second predetermined value and the steering amount detected by the steering amount detecting means.

2. A slip control system for a motor vehicle in accordance with claim 1 in which said yawing rate detecting means includes a yawing rate detecting sensor.

3. A slip control system for a motor vehicle in accordance with claim 1 in which said yawing rate detecting means includes a vehicle speed sensor.

4. A slip control system for a motor vehicle in accordance with claim 1 and further comprising an ABS control system.

5. A slip control system for a motor vehicle in accordance with claim 1 wherein said slip decreasing means includes brake control means for controlling a driving force of the driving wheel and engine control means for controlling an output of an engine.

6. A slip control system for a motor vehicle in accordance with claim 5 in which said engine control means decreases the output of the engine by controlling an opening of a throttle valve.

7. A slip control system for a motor vehicle in accordance with claim 6 in which said engine control means includes a throttle opening control mechanism which controls the opening of the throttle valve.

8. A slip control system for a motor vehicle in accordance with claim 1 wherein one of a plurality of corrected slip ratios is a minimum slip ratio when the yawing rate is at least equal to the first predetermined value and the steering amount is no more than the second predetermined value.

9. A slip control system for a motor vehicle in accordance with claim 8 wherein said one of a plurality of corrected slip ratios is an intermediate slip ratio, between said predetermined desired slip ratio and said minimum slip ratio, when the yawing rate is at least equal to first predetermined value and the steering amount is more than said second predetermined value.

10. A slip control system for a motor vehicle in accordance with claim 1 wherein said motor vehicle has undriven and steered front wheels and driving rear wheels.

11. A slip control system for a motor vehicle in accordance with claim 10 wherein said motor vehicle is in said unstable condition when the yawing rate is no less than the first predetermined value and the steering amount is no greater than the second predetermined value.

12. A slip control system for a motor vehicle in accordance with claim 10 in which said correcting means decreases the desired slip ratio by a first correction amount when a yawing rate which is at least equal to the first predetermined value is detected by the yawing rate detecting means and a steering amount which is no more than the second predetermined value is detected by the steering amount detecting means, and by a second correction amount which is smaller than the first correction amount when the yawing rate which is at least equal to the first predetermined value is detected by the yawing rate detecting means and a steering amount which is greater than the second predetermined value is detected by the steering amount detecting means.

13. A slip control system for a motor vehicle, having driving wheels and undriven wheels, which controls slips of the driving wheels comprising:

means for detecting a slip ratio of each driving wheel;

slip decreasing means for decreasing a slip of each driving wheel by controlling a driving force transmitted to the driving wheel so that the slip ratio of the driving wheel is at least equal to a predetermined desired slip ratio after the slip ratio of the driving wheel reaches a threshold for starting a slip control operation and then becomes greater than the threshold;

yawing rate detecting means for detecting an angular speed at which said vehicle moves around a vertical axis, defining a yawing rate of the vehicle; and steering amount detecting means for detecting a steering amount of steering wheels of the vehicle;

wherein said slip decreasing means includes correcting means for decreasing the desired slip ratio when a steering condition, obtained from both the steering amount detected and the yawing rate detected by the yawing rate detecting means, is in a predetermined range and for not decreasing the desired slip ratio when the steering condition is not in said predetermined range, one of a plurality of corrected slip ratios being a minimum slip ratio when the yawing rate is at least equal to the predetermined value and the steering amount is no more than a second predetermined value.

14. A slip control system for a motor vehicle in accordance with claim 13 in which said yawing rate detecting means includes a yawing rate detecting sensor.

15. A slip control system for a motor vehicle in accordance with claim 13 in which said yawing rate detecting means includes a vehicle speed sensor.

16. A slip control system for a motor vehicle in accordance with claim 13 and further comprising an ABS control system.

17. A slip control system for a motor vehicle in accordance with claim 13 wherein said slip decreasing means includes brake control means for controlling a driving force of the driving wheel and engine control means for controlling an output of an engine.

18. A slip control system for a motor vehicle in accordance with claim 17 in which said engine control means decreases the output of the engine by controlling an opening of a throttle valve.

19. A slip control system for a motor vehicle in accordance with claim 18 in which said engine control means includes a throttle opening control mechanism which controls the opening of the throttle valve.

20. A slip control system for a motor vehicle in accordance with claim 13 wherein said one of a plurality of corrected slip ratios is a minimum slip ratio when the yawing rate is at least equal to the predetermined value and the steering amount is no more than a second predetermined value.

21. A slip control system for a motor vehicle in accordance with claim 20 wherein said one of a plurality of corrected slip ratios is an intermediate slip ratio, between said predetermined desired slip ratio and said minimum slip ratio, when the yawing rate is at least equal to the predetermined value and the steering amount is more than said second predetermined value.

22. A slip control system for a motor vehicle in accordance with claim 13 wherein said motor vehicle has undriven and steered front wheels and driving rear wheels.

23. A slip control system for a motor vehicle in accordance with claim 22 wherein said steering condition is in said predetermined range when the yawing rate is no less than a predetermined value and the steering amount is no greater than a predetermined value.

24. A slip control system for a motor vehicle in accordance with claim 22 in which said correcting means decreases the desired slip ratio by a first correction amount when a yawing rate which is at least equal to a predetermined value is detected by the yawing rate detecting means and a steering amount which is no more than a predetermined value is detected by the steering amount detecting means, and by a second correction amount which is smaller than the first correction amount when the yawing rate which is at least equal to a predetermined value is detected by the yawing rate detecting means and a steering amount which is greater than a predetermined value is detected by the steering amount detecting means.

25. A slip control system for a motor vehicle, having driving wheels and undriven wheels, which controls slips of the driving wheels comprising:

means for detecting a slip ratio of each driving wheel;

slip decreasing means for decreasing a slip of each driving wheel by controlling a driving force transmitted to the driving wheel so that the slip ratio of the driving wheel is at least equal to a predetermined desired slip ratio after the slip ratio of the driving wheel reaches a threshold for starting a slip control operation and then becomes greater than the threshold;

steering amount detecting means for detecting a steering amount of steering wheels of the vehicle; and yawing rate detecting means for detecting an angular speed at which said vehicle moves around a vertical axis, defining a yawing rate of the vehicle;

wherein said slip decreasing means includes desired slip ratio determining means for determining the predetermined desired slip ratio so that it is greater when the steering amount is large than when the steering amount is small and (1) said desired slip ratio determining means sets said predetermined desired slip ratio to a first value when said yawing rate detecting means detects a yawing rate which is less than a predetermined yawing rate, (2) said desired slip ratio determining means sets said predetermined desired slip ratio to a second value when said steering amount is no larger than a predetermined steering amount, and (3) said desired slip ratio determining means sets said predetermined desired slip ratio to a third value when said steering amount is larger than said predetermined steering amount.

26. A slip control system for a motor vehicle in accordance with claim 25 wherein said first value is larger than said third value.

27. A slip control system for a motor vehicle in accordance with claim 26 wherein said third value is larger than said second value.

* * * * *